(12) United States Patent
Ramani et al.

(10) Patent No.: US 10,102,439 B2
(45) Date of Patent: Oct. 16, 2018

(54) DOCUMENT VERIFICATION METHOD AND SYSTEM

(75) Inventors: Srinivasan Ramani, Bangalore Karnataka (IN); Badri Narayanan Ranganathan, Chennai (IN); Srinivasu Godavari, Bangalore Karnataka (IN); Anjaneyulu Seetha Rama Kuchibhotla, Bangalore (IN); Nagabhushana Ayyanahalli Matad, Bangalore Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 2627 days.

(21) Appl. No.: 12/349,311

(22) Filed: Jan. 6, 2009

(65) Prior Publication Data

US 2009/0180698 A1 Jul. 16, 2009

(30) Foreign Application Priority Data

Jan. 14, 2008 (IN) .............................. 131/CHE/2008

(51) Int. Cl.
*G06Q 20/12* (2012.01)
*G06K 9/20* (2006.01)
*G07D 7/0047* (2016.01)

(52) U.S. Cl.
CPC ......... *G06K 9/2063* (2013.01); *G07D 7/0047* (2017.05); *G06K 2209/01* (2013.01); *G06Q 20/1235* (2013.01)

(58) Field of Classification Search
CPC ............. G06K 9/2063; G06K 2209/01; G07D 7/0047; G06Q 20/1235
USPC .......................................................... 705/51
See application file for complete search history.

(56) References Cited

U.S. PATENT DOCUMENTS

| | | | |
|---|---|---|---|
| 4,807,287 A | 2/1989 | Tucker et al. | |
| 5,388,158 A | 2/1995 | Berson | |
| 6,047,093 A | 4/2000 | Lopresti | |
| 6,907,528 B1 | 6/2005 | Bunn | |
| 7,474,441 B2 * | 1/2009 | Karito ................. | H04N 1/4052 358/3.01 |
| 2004/0174569 A1 * | 9/2004 | Karito ................. | H04N 1/4052 358/3.01 |
| 2005/0273597 A1 * | 12/2005 | Lapstun ............... | G06Q 10/087 713/157 |
| 2006/0020803 A1 * | 1/2006 | O'Hagan ............... | G06K 19/08 713/176 |
| 2006/0236110 A1 | 10/2006 | Schaub | |
| 2007/0220614 A1 * | 9/2007 | Ellis .................... | G06F 21/6245 726/27 |
| 2008/0082827 A1 * | 4/2008 | Agrawal ................ | H04L 63/10 713/176 |
| 2008/0243898 A1 * | 10/2008 | Gormish ................ | G06F 21/64 |

* cited by examiner

*Primary Examiner* — James D Nigh
(74) *Attorney, Agent, or Firm* — HP Inc. Patent Department (57) ABSTRACT

A method of and system for verifying a document, the method comprising generating verification information for the document, comparing the verification information with authentic verification information, and identifying differences between the document and an authentic document.

10 Claims, 6 Drawing Sheets

INSTITUTE OF SCIENCE AND TECHNOLOGY
GRADE SHEET

| W54 | SEVENTH SEMESTER 2001-5 | 22-03-2005 |

ID NO.    1BIC1C
NAME     Raj Shekhar
ADDRESS  K R Layout, Mysore

| COURSE NO. | COURSE TITLE | UNIT | GRADE |
| --- | --- | --- | --- |
| BTS C31 | LAB ORIENTED PROJECT | 3 | A EL |
| BTS C32 | STUDY ORIENTED PROJECT | 3 | A EL |
| EEE C31 | CODING THEORY AND PRACTICE | 5 | A EL |
| EEE C41 | DIGITAL COMMUNICATION | 3 | W EL |
| EEE C42 | DIGITAL SIGNAL PROCESSING | 3 | B EL |

| CGPA CUP | 1320 | ACCU CUP | 1320 |
| --- | --- | --- | --- |
| ACCUMULATED UNITS | | | 141 |
| UNITS FOR CALCULATING CGPA | | | 141 |
| CGPA | | | 9.36 |

DOCUMENT VERIFICATION METHOD AND SYSTEM

CROSS-REFERENCE TO RELATED APPLICATION

This application claims priority to Indian Patent Application No. 131/CHE/2008, entitled "DOCUMENT VERIFICATION METHOD AND SYSTEM", filed on Jan. 14, 2008, which is hereby incorporated by reference in its entirety.

BACKGROUND TO THE INVENTION

Forged or manipulated documents can be used for nefarious purposes, such as immigration fraud, faking academic credentials and/or other illegal and immoral purposes. To combat this, a party that receives a document may contact a party that issued the document to verify, for example verbally, that the document is authentic and has not been forged and/or manipulated. For a large number of documents, receiving parties and/or issuing parties this system may become impractical. For example, the system may become time-consuming and/or expensive, and may be prone to errors.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the invention store authentic verification information for a document such that a party receiving the document may generate verification information from the document, and compare the verification information with the authentic verification information to determine whether the document is genuine, and has not been forged and/or manipulated. In embodiments of the invention, the authentic verification information may be stored in a database that is accessible by the receiving party via a network, for example via the internet.

In embodiments of the invention, the authentic verification information cannot be used to reconstruct the document or an image of the document, or some or all of the content of the document. This way, the privacy of the individual associated with the document is preserved, as the document may contain personal details. Such personal details cannot be reconstructed, in whole or in part, from the authentic verification information by a party that has access to the authentic verification information. A document is associated with an individual if the document is connected with the individual, for example is owned by the individual or describes some of the individual's personal details. The document content is that part of the document that conveys information to a human reader of the document, and may comprise, for example, text, images and/or any other human readable content.

Therefore, for example, if an individual has access to the authentic verification information (for example, if it is stored within a database), the individual cannot use the authentic verification information to produce a copy of the document or some of the document, or produce the content of the document or some of the content.

In embodiments of the invention, a machine-readable portion is applied to the authentic document. The machine-readable portion contains or indicates machine-readable document information. The document information contains information relating to the content of the document. For example, the document information may comprise one or more of text information contained within the document, images contained within the document or other information related to the document. The machine-readable portion may store the document information in digital form. For example, the machine-readable portion may comprise one or more of a one- or two-dimensional barcode, magnetic strip, RFID tag and other forms of machine-readable portion. In embodiments of the invention, the machine-readable information becomes authentic after successful verification. Until then it could be fraudulent document information applied to the document.

In embodiments of the invention, the authentic verification information may comprise information that is derived from the authentic document information. For example, the authentic verification information may comprise a hash value of the authentic document information. The hash value may be obtained, for example, by providing the authentic document information to a hash function and receiving the hash value as an output from the function.

In embodiments of the invention, a party that receives a document may verify the document by reading the machine-readable portion of the document, and generating verification information (such as, for example, a hash value) from data or information read from the machine-readable portion. The document information is verified to be genuine document information by comparing the verification information with the authentic verification information, for example by sending the verification information to a remote system and receiving a response indicating whether the verification information matches the authentic verification information stored by the system. The receiving party may then extract document information from the document and determine whether the extracted document information matches the document information read from the machine-readable portion of the document.

Figure 1:
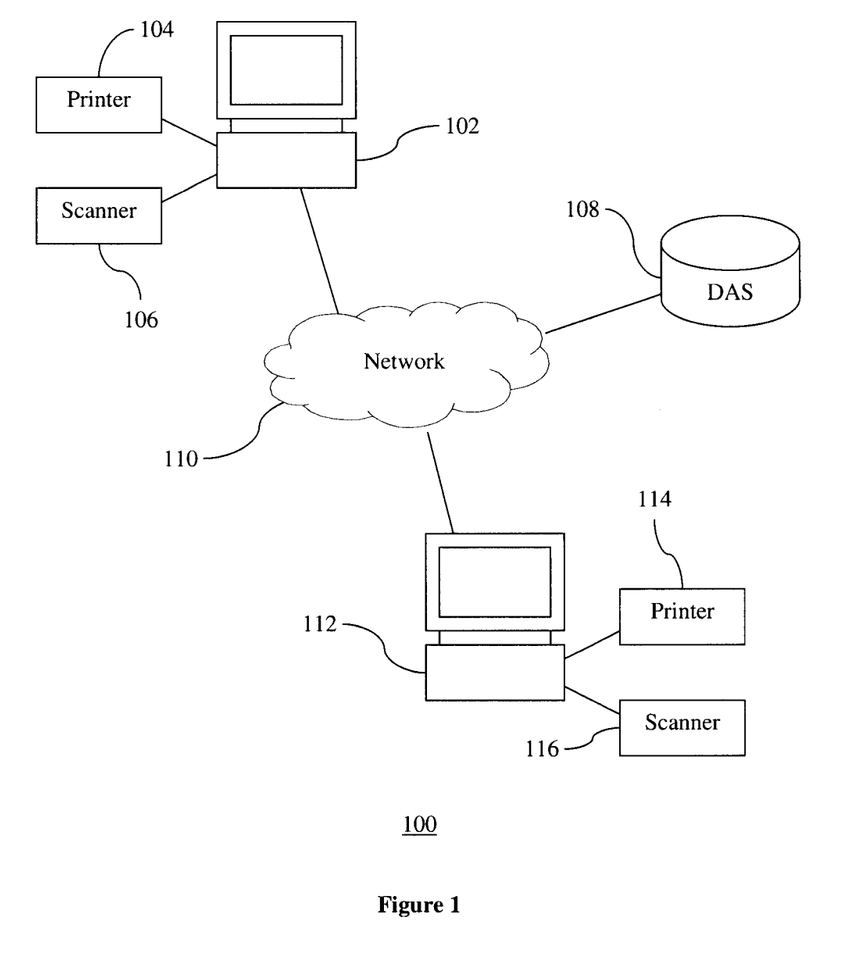
FIG. 1 shows an example of a system according to embodiments of the invention.

FIG. 1 shows an example of a system 100 for verification of documents. A document issuer 102 generates authentic documents and applies machine-readable markings to the documents. The document issuer 102 may include a printer 104 and/or a scanner 106. The document issuer may communicate with a document authentication system (DAS) 108 (such as a server, for example) via a network 110. The network 110 may comprise, for example, one or more wired and/or wireless networks such as a LAN, WAN, the internet, Wi-Fi and the like.

The DAS 108 stores authentic verification information for a plurality of documents, along with respective document identifiers (DIDs). A DID is an identifier given to each authentic document that allows the document to be uniquely identified. The DID may be readable from the document, for example from the machine-readable portion of the document and/or from the document content.

The system 100 also includes a receiving party 112. The receiving party 112 is the party that receives a document that must be verified. The receiving party may include a printer 114 and/or scanner 116. The receiving party may communicate with the DAS 108 via the network 110.

Figure 2:
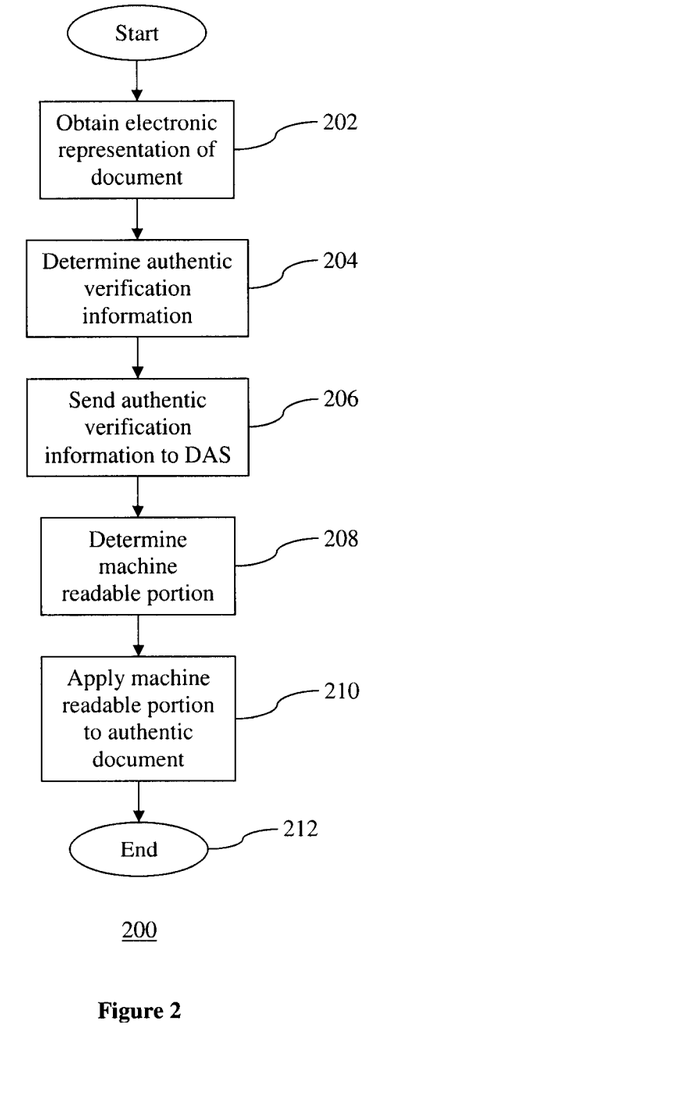
FIG. 2 shows an example of a method of generating a document according to embodiments of the invention.

FIG. 2 shows an example of a method 200 of generating an authentic document. The method 200 may be performed by, for example, the document issuer 102 shown in FIG. 1. The method 200 starts at step 202 where the document issuer 102 obtains an electronic representation of the document to be issued. This may be done, for example, by scanning the document using the scanner 106. Alternatively, the document issuer 102 may generate an electronic representation of the document, for example manually or automatically using available data. The electronic representation could then be obtained from the machine-readable portion of the document. Alternatively, the document issuer 102 may obtain the electronic representation using other means, for example by receiving the electronic representation in an email.

The document issuer 102 also obtains a document identifier (DID) for the document. This may be done, for example, by extracting the DID from the document content (for example, using OCR) or receiving the DID from another source (for example, from manual entry of the DID or from automatic generation of the DID).

The method 200 then continues to step 204, where the document issuer 102 determines authentic verification information for the document. The document issuer 102 does this by first determining authentic document information for the document. The authentic document information is authentic because it is generated from the document which is known to be authentic by the document issuer 102. The authentic document information comprises information related to the content of the document. Examples of authentic document information are given later in this specification. In embodiments of the invention, the authentic document information comprises one or more bytes of digital data.

In embodiments of the invention, the authentic verification information cannot be used to compromise the privacy of an individual associate with a document. For example, the authentic verification cannot be used to reproduce an image of some or all of the document, or to reproduce some or all of the document content. Thus, the privacy of the individual is preserved, even when the authentic verification information is sent by the document issuer 102 to the DAS 108 for storage by the DAS 108.

The authentic verification information is generated from the authentic document information. In embodiments of the invention, the authentic verification information comprises one or more hash values for the authentic document information. For example, the authentic verification information may comprise a hash value generated by supplying the authentic document information to a hash function. Examples of suitable hash functions include Secure Hash Algorithm (SHA) functions, MD5 and the like.

Once the authentic verification information has been determined in step 204, the document issuer 102 sends the authentic verification information to the document authentication system (DAS) 108 via the network 110 in step 206. The authentic verification information may be accompanied by a document identifier (DID), which can be used to uniquely identify the document. The DID may comprise, for example, information that uniquely identifies the document issuer 102, and information that uniquely identifies the document among the documents issued by the document issuer 102. Alternatively, for example, the DID may comprise an identifier that identifies the document among all the documents for which the DAS 108 stores authentic verification information.

The document issuer 102 then determines a machine-readable portion in step 208 of the method 200. The machine-readable portion contains information that is to be read by a party that receives the document. The machine-readable portion is suitable for being read by a machine, for example a scanner, barcode reader, RFID tag reader, and any other suitable machine. In embodiments of the invention, the machine-readable portion comprises the authentic document information encoded into a suitable format. For example, the machine-readable portion may comprise the document information encoded into a two-dimensional barcode according to the PDF417 (ISO/IEC 15438) specification. In embodiments of the invention, the DID is encoded within the machine-readable portion of the document. Additionally or alternatively, the DID may be derivable from the document, for example using optical character recognition (OCR) to read, for example, a document number, name and/or any other document identifier. Where the DID is incorporated into the machine-readable portion of the document, the DID may be extracted more reliably than, for example, where the DID is extracted from the document content (for example, using OCR to extract the DID from an image of the document). Reliably determining the DID from the document may assist verification of the document as verification information is stored against a DID in the DAS 108.

Once the machine-readable portion has been determined in step 208, it is applied to the authentic document at step 210. This may be done by programming a RFID tag or magnetic strip attached to the document, printing a barcode on the document, or any other suitable method of applying a machine-readable portion to the document. Where the document exists only as an electronic representation, the document may be printed first, or the machine-readable marking may, where appropriate, be applied to the electronic representation which is then printed. The method 200 then ends at step 212.

Figure 3:
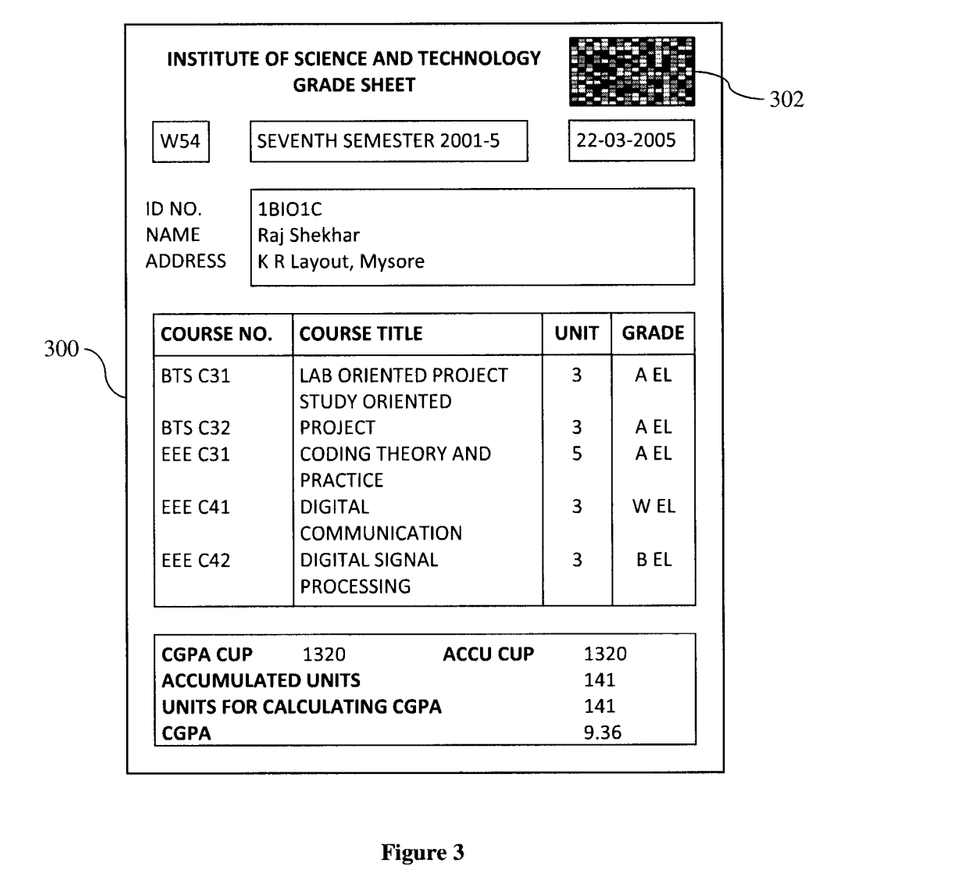
FIG. 3 shows an example of a document according to embodiments of the invention.

FIG. 3 shows an example of an authentic document 300. The authentic document 300 includes a machine-readable marking 302 in the form of a two-dimensional barcode.

Once the authentic document has been generated according to the method 200, the document is then issued. For example, the document may be given or sent to an individual connected with the document (for example, the document may be the individual's birth certificate), or may be given or sent to a receiving party.

Figure 4:
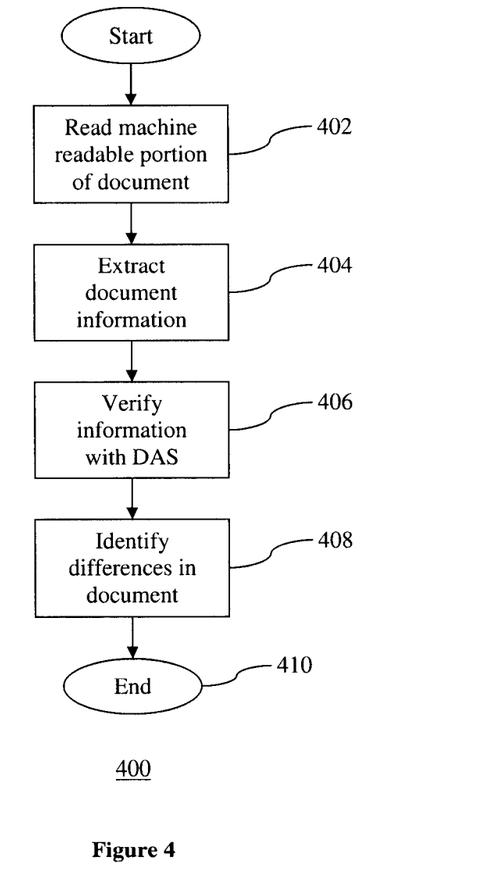
FIG. 4 shows an example of a method of verifying a document according to embodiments of the invention.

FIG. 4 shows an example of a method 400 of verifying a document according to embodiments of the invention. The method 400 may be performed by a party receiving a document to be verified, for example by the receiving party 112 shown in FIG. 1. The method starts at step 402 where the machine-readable portion of the document is read. The process for doing this depends on the implementation of the machine-readable portion. For example, where the machine-readable portion is an RFID tag, data is read from the machine-readable portion. Where the machine-readable portion is a barcode, the barcode is scanned and read. This may involve scanning just the machine-readable portion or the whole document. The machine-readable portion may be located, for example, by looking for fiducial marks or other marks indicating the position of the machine-readable portion, looking for the portion in one or more predetermined positions on the document, and any other suitable method of locating the machine-readable portion.

In embodiments of the invention, the machine-readable portion may comprise fiducial marks that enable document information to be determined from the document. An example of this is given later in this specification.

Once the machine-readable portion is read in step 402, document information is extracted from the machine-readable portion (or the data read therefrom). Next, in step 406, the authentic document information is verified with the document authentication system (DAS) 108 (shown in FIG. 1), to determine whether or not it is authentic. This may be done, for example, by determining verification information for the document information and sending the verification information to the DAS 108 in a fashion similar to that described above with reference to steps 204 and 206 of FIG. 2. For example, the verification information comprises a hash value for the document information. If the verification information matches the authentic verification information held by the DAS 208, then the document information read or extracted from the machine-readable portion of the document is in fact authentic (that is, it matches the authentic document information of a document produced by the document issuer 102). The DAS 108 sends a response to the receiving party 112 indicating whether the verification information generated by the receiving party 112 matches that held by the DAS 108. If the DAS 108 responds that it does not match, then the document held by the receiving party 112 includes document information in the machine-readable portion that is not authentic. In this case, the receiving party 112 may decide that the document is not genuine and has failed the verification.

If the DAS 108 responds that there is a match, then the document information read or extracted from the machine-readable portion of the document is authentic document information. The method 400 then proceeds to step 408, where the receiving party identifies differences between the document and the genuine document issued by the document issuer 102. This may be done, for example, by the receiving party 112 generating document information from the document, and comparing the generated document information with the authentic document information read or extracted from the machine-readable portion of the document. Examples of identifying differences are given later in this specification.

Once differences between the document received by the receiving party 112 and the authentic document issued by the document issuer 102 are identified, the receiving party can use this information to decide whether the document is authentic (i.e. whether it is identical to the authentic document or differs only in immaterial details). For example, if no differences between the document and the authentic document are identified, or if differences are identified that are immaterial, then the receiving party 112 may decide that the document is identical to the authentic document (or, that the document is the authentic document issued by the document issuer 102, and the document has not been tampered with or altered).

If the document issuer 102 identifies significant differences between the document and the authentic document, for example differences in some or all of the content, then the receiving party 112 may decide that the document is not an authentic document and the document possessed by the receiving party 112 may have been forged or manipulated.

Once differences are identified in step 408, if any, the method 400 ends at step 410.

FIRST EXAMPLE

A first example of a system for implementing embodiments of the invention will now be described. The document issuer 102 issues an authentic document that includes text content. The text content comprises some or all of the text within the authentic document. For example, the text content comprises all of the text content including any static information (such as table column headers and the like) and document-specific information, such as the name of the individual associated with the document, a document identifier and the like. Alternatively, the text content comprises only the document-specific information, or any combination of some or all of the static information and/or some or all of the document-specific information. The text content may be obtained by the document issuer 102. For example, the document issuer 102 may scan some or all of the document and use optical character recognition (OCR) techniques to extract text content. Alternatively, for example, the text content may be extracted from an electronic representation of the document that is already in the possession of the document issuer 102.

The document 300 includes a document identifier that allows the document 300 to be uniquely identified. The document identifier may be, for example, the ID NO. shown on the document, or may be embedded within the machine-readable portion 302, or may be a combination of two or more features of the document 300.

In step 204 of the method 200 of FIG. 2, the document issuer 102 determines authentic verification information from the authentic document information. The authentic document information comprises the text content of the authentic document.

The authentic verification information comprises a table of hash values determined as follows.

The text content is divided up into a number of fixed size blocks. For example, each block may comprise 64 characters (bytes), or any other number of characters or bytes. If the final block in the text content is smaller than the block size, padding characters may be added, or the final block may be a different size to other blocks. In other embodiments, for example, the blocks may all be of different sizes.

For each block, two hash values are calculated. Where there are n blocks, numbered 1 to n, a first hash value $h_{1,j}$ and a second hash value $h_{j,n}$ are calculated for a block number j. The first hash value $h_{1,j}$ is a hash value of all of the blocks 1 to j inclusive. The second hash value $h_{j,n}$ is a hash value of all of the blocks j to n inclusive. The table below shows the forward and backward hash values for the blocks of text content Tj:

| Text block | First hash value | Second hash value |
| --- | --- | --- |
| T1 | $h_{1,1}$ | $h_{1,n}$ |
| T2 | $h_{1,2}$ | $h_{2,n}$ |
| T3 | $h_{1,3}$ | $h_{3,n}$ |
| ... | ... | ... |
| Tn | $h_{1,n}$ | $h_{n,n}$ |

The authentic verification information comprises the first and second hash values. This information is sent to the document authentication system (DAS) 108 along with the document identifier (DID) in step 206 of the method 200. The authentic verification information and DID are stored by the DAS 108. In embodiments of the invention, it is not possible to determine the text content from the authentic verification information (i.e. from one, some or all of the hash values). As such, the privacy of the individual associated with the authentic document is preserved.

In step 208 of the method 200, the document issuer 102 determines (i.e. prepares) the machine-readable portion of the authentic document. In this example, the machine-readable portion is a two-dimensional barcode, as shown as an example in the machine-readable portion 302 of the document 300 shown in FIG. 3. The document issuer 102 determines the two-dimensional barcode such that it contains the text content of the authentic document, and any other information as appropriate. Thus, the text content is the authentic document information stored in the machine-readable portion. In embodiments of the invention, the document identifier (DID) is also stored within the machine-readable portion.

Some or all of the data stored within the machine-readable portion may be encrypted and/or digitally signed if required. The document issuer 102 then applies the machine-readable portion to the authentic document in step 210. This may comprise applying the portion to the electronic representation of the authentic document and printing the authentic document, or printing the machine-readable portion onto the authentic document.

The receiving party of a document may verify a document by extracting the text content (the document information) from the machine-readable portion of the document in step 404 of the method 400 shown in FIG. 4, and extracting the document identifier from the document. The receiving party, in step 406 of the method 400, verifies the extracted document information with the DAS by sending the document identifier (DID) to the DAS 108. The DAS 108 responds by requesting the first and second hash values for a random block number j. The receiving party determines verification information by calculating the first and second hash values $h_{1,j}$ and $h_{j,n}$ for the extracted document information, and sending these values to the DAS 108. The DAS 108 compares these values with the appropriate values stored by the DAS against the document identifier. If these values do not match, then the document information extracted from the machine-readable portion of the document is not authentic as the hash values calculated from it are not correct. Thus, the receiving party may decide that the document is not authentic.

If the values match, then the document information is authentic. The receiving party then generates document information from the document. The document information may be generated by, for example, extracting the text content from the document. This may be done, for example, by scanning some or all of the document and extracting the text content using, for example, optical character recognition (OCR).

Differences between the document and the authentic document are then identified in step 408 as follows. The document information is compared with the authentic document information. That is, the text content extracted from the document is compared with the text content extracted from the machine-readable portion of the document. If these match, then the document is an authentic document.

If they do not match, then the document may or may not be an authentic document. The differences may be highlighted to the document issuer. For example, a data processing system display may display an image of the document on which differences are highlighted (for example, by displaying the differences in a different colour, within a highlighting box and/or any other method of highlighting). Alternatively, a printout may be printed that highlights the differences. The receiving party may use the identified differences to determine whether or not the document is authentic. For example, the text content may be different in immaterial details due to errors in generating the text content from the document, for example OCR errors. Alternatively, the differences may be found within important information within the text content, such as for example within the name indicated on the document. If differences are found within the important information, the receiving party may decide that the document is not an authentic document.

In an alternative embodiment, the receiving party may print or display the authentic text content extracted from the machine-readable portion of the document without extracting text content from the document (for example, using OCR). The receiving party may then manually identify differences (if any) between the document and the authentic text content.

SECOND EXAMPLE

Figure 5:
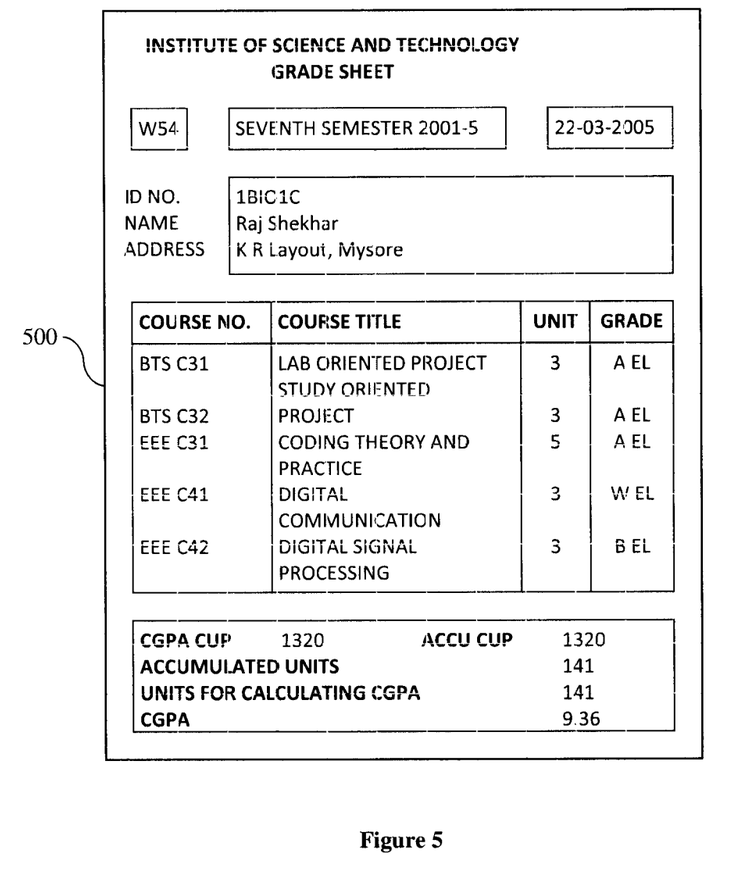
FIG. 5 shows an example of another document according to embodiments of the invention.

A second example of a system for verifying a document will now be described. The document issuer 102 generates an authentic document 500 as shown in FIG. 5. The machine-readable portion comprises, at least in part, a series of horizontal and vertical grid lines on the document 500 as shown. The grid lines are shown on top of the content of the document 500, although in alternative embodiments they may be behind the text content. In alternative embodiments, the grid lines may be at other angles and/or other spacings. The grid lines may be any colour, for example yellow. The grid lines should not significantly affect the readability of the content of the document 500.

The grid lines divide the document up into a number of cells. The document issuer 102 determines properties of one, some or all of the cells as the authentic verification information as follows.

In this example, the machine-readable portion of the document comprises the grid lines on the document. The authentic document information comprises the content of the document located within each cell, and the authentic verification information comprises cell properties that are determined from the document. Thus, in this example, the machine-readable portion does not store the authentic document information as such. However, the machine-readable portion allows a machine to reliably extract authentic document information from the document and use it to construct verification information.

Properties of a cell are chosen such that the portion of the document contained within a cell, or any content within that cell, cannot be reconstructed from the verification information (cell properties). Therefore, the privacy of an individual associated with the document is preserved, as it is not possible to reconstruct the whole or parts of the document from the cell properties.

In one embodiment, the properties of each cell are determined from an electronic representation of the document, the electronic representation comprising an image of the document that is obtained, for example, by scanning the document or otherwise. The pixels in the image are given weights. For example, the black pixels are given a weight of 1 whereas the white pixels are given a weight of 0. The properties comprise one or more of the x and y coordinates (within the cell or within the document) of the centre of gravity of the pixels, the moments of inertia about a horizontal and a vertical axis, and a total of the pixel weights in the cell. Where there are multiple colours and/or gray levels for the pixels, the pixels may be given appropriate weights.

In an alternative embodiment, a cell's properties may comprise, for example, a Radon transformation of pixels in the cell. The pixels may be reconstructible if a high resolution of the transform is used for the electronic representation of the authentic document, and thus potentially some or all of the document could be reconstructed from this data. This would mean that the information stored by the DAS 108 could potentially be used to violate the privacy of an individual associated with the document. Therefore, a resolution of the transform is chosen such that a readable document cannot be reconstructed from the Radon transformations of the cells.

In an alternative embodiment, the properties of a cell may comprise a histogram of some or all of the pixels in the cell.

The cell properties may comprise one or more of the examples of the cell properties given above, and/or may comprise some other properties of the pixels within the cells.

Once the properties have been determined for one, some or all of the cells, the properties are sent by the document issuer 102 to the DAS 108 for storage, along with a document identifier (DID) that uniquely identifies the authentic document. As indicated above, storage of the cell properties (the authentic verification information) by the DAS 108 does not compromise the privacy of an individual associated with the document.

The receiving party 112 of the document extracts document information in step 404 of the method 400 by locating the grid lines on an electronic representation of the document, which determines the position of the cells in the document. The receiving party 112 may, once the grid lines have been located, correct the electronic representation or re-scan the document to obtain a corrected electronic representation if required. The document information comprises the pixels in the cells in the electronic representation. The receiving party then determines the verification information (cell properties) from the electronic representation of the document. Once the cell properties have been determined, these are sent to the DAS 108 for verification. A response from the DAS 108 indicates whether the cell properties (i.e. the verification information) matches the authentic verification information stored by the DAS 108.

If the verification information does not match, one or more cells have properties that do not match those stored by the DAS 108. The response from the DAS 108 to the receiving party 112 may allow the receiving party to determine which cells do not match. These cells may be highlighted by the receiving party 112 as differences between the document and the authentic document. Methods of highlighting can be used as described above with reference to the first example.

This second example as described above is particularly suited to use with documents that include graphical images. The cell properties are calculated in terms of the pixels within the cell, and can be applied to monochromatic, grayscale or colour pixels as appropriate. Therefore, the properties of a cell are not dependent on the type of information contained within the cell, for example text or graphical images. Examples of graphical images that may be found on a document include photographs, logos and other graphical images.

THIRD EXAMPLE

A third example of a system for verifying a document will now be described. Some documents may conform to a standard template. That is, some of the document comprises static information that does not change between documents that relate to different individuals, for example. Other parts of the document (document-specific information) may present information that is specific to a document. For example, document-specific information may include the name, date of birth and a photograph of the individual associated with the document. The document-specific information may be located within fields that are located in certain places on the document.

In this example, at least part of the electronic representation of a document obtained by the document issuer 102 in step 202 comprises a text representation of the fields of the document and the information that they contain. In one embodiment, XML is used to describe the fields and the information contained within them. For example, the following XML document is an electronic representation of an authentic document and describes two fields, "name" and "semester", and describes the location and size of the fields in the document:

```
<name x='50' y='400' w='90' h='30'>
    G S Srinivas
</name>
<semester x='50' y='350' w='20' h='30'>
    1
</semester>
```

In the above XML example, the "name" field is located at the x,y coordinates (50,400) on the document and has a width of 90 and a height of 30. The data to go in the field comprises "G S Srinivas", i.e. the name of the individual associated with the document. The electronic representation may, however, be implemented differently using XML and/or other markup languages, or in other ways.

The electronic representation may be obtained by the document issuer 102 may be obtained in a number of ways. For example, the document issuer 102 may electronically generate an authentic document (for example, using word processing software), and the field values and locations may be retrieved from the electronic document to form the electronic representation. Alternatively, a template may be used. An example of a template in XML is given below:

```
<name x='50' y='400' w='90' h='30'>
</name>
<semester x='50' y='350' w='20' h='30'>
</semester>
```

The above XML template describes the locations and sizes of the "name" and "semester" fields. This information can be used to locate these fields on an electronic representation of an authentic document (for example, where the electronic representation is obtained by scanning the document). The data from the fields can be inserted into the XML document by locating the appropriate field on the document using the x and y coordinates and field size values, and extracting text content therefrom, for example using OCR. The above XML template can be used, for example, to generate the above XML electronic representation of the authentic document from the authentic document.

The document issuer 102 creates a machine-readable portion of the authentic document that contains the XML electronic representation as authentic document information. In one embodiment, for example, the machine-readable portion is a two-dimensional barcode. The authentic document verification information is calculated by the document issuer 102 in step 204 of the method 200. The authentic verification information may comprise, for example, a hash value, a table of first and second hash values and/or any other suitable verification information. The document issuer 102 sends the authentic verification information to the DAS for storage along with a document identifier (DID). Privacy of an individual associated with the document is preserved when the DAS 108 stores the authentic verification as it is not possible to determine the document or the content of the document, at least in part, from the authentic verification information.

The receiving party 112 of the document extracts the XML electronic representation of the document from the machine-readable portion of the document, and calculates the verification information. This is sent to the DAS 108 (along with the DID), which indicates whether the verification information matches the authentic verification information stored by the DAS.

Where there is a match, the receiving party 112 uses the XML representation to locate fields within the document and extract text data therefrom (for example, by using OCR to extract text from a scanned image of the document). This text data is compared with text data from the XML representation, and any differences can be identified and may be highlighted as appropriate.

Figure 6:
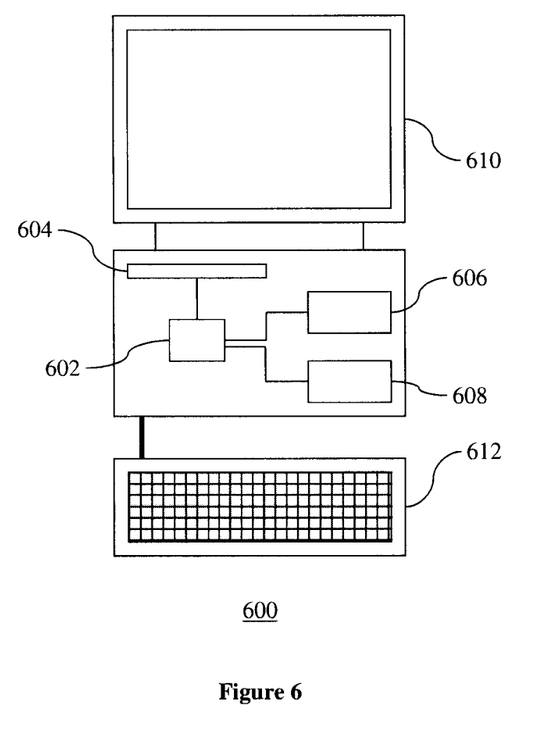
FIG. 6 shows an example of a data processing system suitable for use with embodiments of the invention.

FIG. 6 shows an example of a data processing system 600. One or more such data processing systems 600 may form the document issuer 102, the document authentication system (DAS) 208 and/or the receiving party 112.

The data processing system 600 includes a data processor 602 and memory 604 (such as, for example, RAM). The data processing system may also include a permanent storage device 606 (for example, a hard disk) and/or a communications device 608 that allows the data processing system 600 to communicate with one or more networks. The data processing system 600 may also include a display device 610 and/or a human interface device 612 (such as, for example, a mouse and/or keyboard).

A data processing system may omit one or more of the above-identified components and/or include one or more further components where appropriate.

In embodiments of the invention described above, the authentic document information stored within the machine-readable portion of the document may not comprise the whole of the document (for example, a scanned image of the whole document, images within the document and/or all of the text within the document). Instead, the authentic document information includes information which can be used to determine whether important parts of the document have been tampered with. For example, the information may include some or all of the text content, content from fields within the document or properties of cells from a scanned image of the document. Thus, the size of the machine-readable portion may be reduced when compared to a portion that stores, for example, a scanned image of the whole document, images within the document and/or all of the text within the document.

The system 100 of FIG. 1 shows that the document issuer 102, DAS 108 and receiving party 112 are separate parties. However, in other embodiments, one or more of these may alternatively be a single party. Additionally or alternatively, there may be more than one document issuer and/or more than one receiving party.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of verifying a document, comprising:
receiving, by an issuer computer, a digital representation of a scanned printed document, wherein the scanned printed document is generated by
scanning, by a scanner, a document comprising text content and a document identifier,
generating, by the issuer computer, an issuer hash by dividing the scanned document into a plurality of data blocks and generating for each data block a pair of hashes,
transmitting, by the issuer computer, the issuer hash and the document identifier to a document authentication system server,
generating, by the issuer computer, a machine readable code using the text content, and
applying, by the issuer computer, the machine readable code to the document and printing the document;
retrieving, by a receiver computer, the document identifier and text content, from the machine readable code, from the digital representation of the scanned printed document and transmitting the document identifier to the document authentication system server;
receiving, by the receiver computer, a hash values request, from the document authentication system server and by the receiver computer:
retrieving the text content from the machine readable code;

selecting a data block from the text content based on the hash values request;

generating receiver hash values for the selected data block of the text content; and transmitting the receiver hash values to the document authentication system server;

receiving, by the receiver computer, match information from the document authentication system server; and based on the received match information, printing, by the receiver computer, the scanned printed document.

2. The method as claimed in claim 1, wherein the match information is determined by comparing, by the document authentication system server, the receiver hash values with the issuer hash.

3. The method as claimed in claim 1, wherein generating, by the issuer computer, the issuer hash comprises identifying cells in the document, and generating properties of the cells.

4. The method as claimed in claim 3, wherein the properties of each cell comprise at least one of a number of pixels in the cell, a location of the centre of gravity of the pixels in the cell, a moment of inertia of the pixels of the cell about at least one axis, and a Radon transformation of the pixels of the cell.

5. The method as claimed in claim 1, wherein generating, by the issuer computer, the issuer hash comprises extracting text from the document using optical character recognition (OCR).

6. The method as claimed in claim 5, wherein the match information is determined by comparing the extracted text with authentic text extracted from the machine readable code.

7. A system for verifying a document, comprising:

a scanner to scan a printed document comprising text content and a document identifier and to transmit the scanned printed document to an issuer computer;

the issuer computer to receive a digital representation of the scanned printed document;

the issuer computer to generate an issuer hash by dividing the scanned document into a plurality of data blocks and generating for each data block a pair of hashes;

the issuer computer to transmit the issuer hash and the document identifier to a document authentication system server;

the issuer computer to generate a machine readable code using the text content;

the issuer computer to apply the machine readable code to the document and print the document;

a receiver computer to retrieve the document identifier and text content, from the machine readable code, from the digital representation of the scanned printed document and transmit the document identifier to the document authentication system server;

the receiver computer to receive a hash values request from the document authentication system server;

the receiver computer to retrieve the text content from the machine readable code;

the receiver computer to select a data block from the text content based on the hash values request;

the receiver computer to generate receiver hash values for the selected data block of the text content;

the receiver computer to transmit the receiver hash values to the document authentication system server;

the receiver computer to receive match information from the document authentication system server; and based on the received match information, the receiver computer to print the scanned printed document.

8. The system as claimed in claim 7, wherein the match information is determined by comparing, by the document authentication system server, the receiver hash values with the issuer hash.

9. The system as claimed in claim 7, further comprising:

the issuer computer to extract text from the document using optical character recognition (OCR).

10. The system as claimed in claim 9, further comprising the receiver computer to compare the extracted text with authentic text extracted from the machine readable code.

* * * * *